(12) United States Patent
Yamauchi et al.

(10) Patent No.: US 7,144,948 B2
(45) Date of Patent: Dec. 5, 2006

(54) PROCESSES FOR PRODUCING A FLUORORESIN POWDER HAVING CURABLE FUNCTIONAL GROUPS AND ITS COATING COMPOSITION

(75) Inventors: Masaru Yamauchi, Chiba (JP); Toru Ishida, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 232 days.

(21) Appl. No.: 10/863,506

(22) Filed: Jun. 9, 2004

(65) Prior Publication Data

US 2004/0225060 A1 Nov. 11, 2004

Related U.S. Application Data

(63) Continuation of application No. PCT/JP02/13316, filed on Dec. 19, 2002.

(30) Foreign Application Priority Data

Dec. 19, 2001 (JP) ............................. 2001-386061

(51) Int. Cl.
    *C08L 23/18* (2006.01)
(52) U.S. Cl. ................ 524/576; 524/81; 524/495; 524/522; 524/539; 524/544
(58) Field of Classification Search ................ 524/576, 524/544, 522, 539, 81, 495
    See application file for complete search history.

(56) References Cited

U.S. PATENT DOCUMENTS

| 3,758,634 | A | * | 9/1973 | Labana et al. ............... 523/437 |
| 4,739,024 | A | * | 4/1988 | Moggi et al. ................ 526/216 |
| 5,147,934 | A | | 9/1992 | Ito et al. |
| 5,200,442 | A | * | 4/1993 | Schlipf et al. ............... 523/340 |
| 5,219,661 | A | * | 6/1993 | Mascia et al. ............... 428/422 |
| 5,439,896 | A | | 8/1995 | Ito et al. |
| 5,639,560 | A | * | 6/1997 | Moens et al. ................ 428/482 |

FOREIGN PATENT DOCUMENTS

| JP | 48-28550 | | 4/1973 |
| JP | 50-51539 | | 5/1975 |
| JP | 51-57725 | | 5/1976 |
| JP | 51-82321 | | 7/1976 |
| JP | 59-102962 | | 6/1984 |
| JP | 60-21667 | | 5/1985 |
| JP | 61-57609 | | 3/1986 |
| JP | 61-85411 | | 5/1986 |
| JP | 63-264675 | | 11/1988 |
| JP | 1-103670 | | 4/1989 |
| JP | 2-60968 | | 3/1990 |
| JP | 3-500547 | | 2/1991 |
| JP | 4-136036 | | 5/1992 |
| JP | 04-136036 | A * | 5/1992 |
| JP | 6-345822 | | 12/1994 |
| JP | 7-145332 | | 6/1995 |
| JP | 8-118357 | | 5/1996 |
| JP | 2000-34426 | | 2/2000 |
| JP | 1460090 | A1 * | 9/2004 |
| WO | WO 89/12240 | | 12/1989 |
| WO | WO-89/12240 | * | 12/1989 |
| WO | WO-89/12240 | A * | 12/1989 |
| WO | WO-03/051931 | A1 * | 6/2003 |

OTHER PUBLICATIONS

U.S. Appl. No. 10/799,734, filed Mar. 15, 2004, Asakawa et al.
U.S. Appl. No. 10/806,103, filed Mar. 23, 2004, Asakawa et al.
U.S. Appl. No. 10/863,506, filed Jun. 9, 2004, Yamauchi et al.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

It is to provide a production process by which gelation can be prevented, in a case where a solvent is removed from a curable fluororesin to obtain a chief material resin, and then coating additives such as a curing agent are mixed to produce a powder coating composition, or in a case where a curable fluororesin, a curing agent and various additives are dissolved or dispersed in a solvent to prepare a raw material solution, and the solvent is removed from the raw material solution to directly produce a powder coating material.

To a solution or dispersion of a curable fluorinated copolymer (A), a gelation inhibitor (B) is added, followed by mixing, or a gelation inhibitor (B), a curing agent (C) and as the case requires, various additives (D) are added, followed by mixing, and the solution or dispersion is supplied to a thin-film vacuum evaporator to remove the solvent.

11 Claims, No Drawings

US 7,144,948 B2

PROCESSES FOR PRODUCING A FLUORORESIN POWDER HAVING CURABLE FUNCTIONAL GROUPS AND ITS COATING COMPOSITION

TECHNICAL FIELD

The present invention relates to processes for producing a fluororesin powder and its coating composition by means of a thin-film vacuum evaporation method. More particularly, it relates to processes for producing a fluororesin powder having curable functional groups and its coating composition, by which gelation of the resin is less likely to take place even when a solvent is removed by a thin-film vacuum evaporator under a relatively high temperature condition, uniform mixing is easily carried out as compared with a case of production by melt-mixing raw materials for fluororesin powder coating material, and drawbacks of the coating film are less likely to occur.

BACKGROUND ART

Dispersion type thermoplastic fluororesin coating materials containing a polyvinylidene fluoride as the main component and solvent-soluble type thermosetting fluororesin coating materials containing as the main component a copolymer of a fluoroolefin and a vinyl ether or a vinyl ester, have been widely used in recent years in coating material fields e.g. for heavy duty coatings, for buildings or for industry, because of such reasons as corrosion resistance and durability of coating films and that dirt is easily cleaned (e.g. JP-B-60-21667, JP-A-59-102962, JP-A-61-57609).

Further, against environmental pollution problems which are increasing year after year, low-pollution type general powder fluororesin coating materials, in a production of which organic solvent (VOC) emission amount is reduced, have been proposed (e.g. JP-A-1-103670, JP-A-2-60968, JP-A-6-345822, JP-A-7-145332).

In general, a chief material resin used for powder coating materials is solidified by removing a solvent from a resin solution by means of e.g. a continuous vacuum solvent-removing apparatus or spray dryer, prior to mixing with other additives in many cases (e.g. JP-A-8-118357). However, by such a method, if the resin stays in the apparatus for removing the solvent and is heated for a long time, gel particles may be partially formed, and a step of e.g. filtrating the gel particles is required, and coating properties and physical properties of the coating film may decrease in some cases.

In a case of producing a powder coating composition, a production process is commonly employed wherein the chief material resin is roughly pulverized after the solvent is removed by the above method, a curing agent and various additives are dry-blended, and the blend is melt mixed, pulverized again and classified. Thus, because of such a multi-stage production process, the production cost is high as compared with solvent type coating materials at any rate. In order to overcome this problem, it has been attempted to directly obtain a powder coating material by preparing a raw material solution having a chief material resin, a curing agent and various additives as raw materials dissolved or dispersed in a solution, and removing the solvent.

For example, JP-A-2000-34426 proposes a process to obtain a powder coating material by mixing a chief material resin used for a general powder coating material such as an acryl resin and additives such as a curing agent for it, and then subjecting the resulting mixture to spray drying or supplying it to a continuous vacuum solvent-removing apparatus to remove volatile components, by using a low boiling point solvent such as methanol.

However, the present inventors have found that there are still problems even when a low boiling point solvent is used as mentioned above, in a case of a fluororesin having curable functional groups, as different from e.g. acryl resins. Namely, one problem is that no adequate solid content concentration as a powder coating material can be achieved by solvent removal by means of spray drying or a continuous vacuum solvent-removing apparatus at such a low temperature, since an unreacted monomer having a relatively high boiling point remains in the solution after polymerization in practice. Further, the other problem is that gel particles are formed similarly to the time of removing the solvent from the chief material resin as mentioned above, even at a temperature at which no curing reaction will take place, if the solvent is removed at a relatively high temperature in order to increase the above solid content concentration.

The present invention is, first, to overcome the above problems in a case of producing a powder coating composition by removing a solvent from a solution or dispersion of a fluororesin having curable functional groups to obtain a chief material resin for the powder coating composition, and then dry-blending coating additives such as a curing agent. Secondly, it is to overcome the above problems in a case of directly producing a powder coating material by preparing a raw material solution having a fluororesin having curable functional groups, a curing agent and various additives dissolved or dispersed in a solvent, and removing the solvent by means of a continuous vacuum solvent-removing apparatus.

DISCLOSURE OF THE INVENTION

The present invention has been made to overcome the above problems, and first, it provides a process for producing a fluororesin powder having curable functional groups, which comprises adding a gelation inhibitor (B) to a solution or dispersion of a fluorinated copolymer (A) having curable functional groups, followed by mixing, and supplying the solution or dispersion to a thin-film vacuum evaporator to remove the solvent from the solution or dispersion. Secondly, the present invention provides a process for producing a fluororesin power coating composition having curable functional groups, which comprises adding a gelation inhibitor (B), a curing agent (C) and as the case requires, other additives (D) for power coating material to a solution or dispersion of a fluorinated copolymer (A) having curable functional groups, followed by mixing to obtain a resin composition solution or dispersion, and supplying the solution or dispersion to a thin-film vacuum evaporator to remove the solvent from the resin composition solution or dispersion.

BEST MODE FOR CARRYING OUT THE INVENTION

Now, preferred mode for carrying out the present invention will be explained in detail.

Fluorinated Copolymer (A)

First, among raw materials for the powder coating material used in the production process of the present invention, the fluorinated copolymer (A) having curable functional groups is described below.

As the fluorinated copolymer (A), a fluorinated copolymer having curable functional groups and composed of the following polymerized units is preferably used.

| (a) Fluoroolefin | 35–99 mol % |
| (b) Monomer having a curable functional group | 1–30 mol % |
| (c) Another copolymerizable monomer | 0–64 mol % |

More preferably, one composed of the following polymerized units is used.

| (a) Fluoroolefin | 35–65 mol % |
| (b) Monomer having a curable functional group | 1–30 mol % |
| (c) Another copolymerizable monomer | 20–60 mol % |

In the above composition, the fluoroolefin (a) may be of one type or a combination of at least two types. If the amount of the fluoroolefin is smaller than the above composition, weather resistance tends to decrease, and if the amount is larger than the above, the composition of the copolymer tends to be non-uniform, and physical properties of the coating film tends to decrease. If the amount of the monomer (b) having a curable functional group is smaller than the above range, curing may not be adequately carried out, and if it is larger than the above range, decrease in weather resistance of the coating film and drawbacks of the coating film tend to increase. Further, if the amount of another copolymerizable monomer (c) is too large, quality of the coating film such as weather resistance tends to decrease. Here, the lower limit of (c) of 0% indicates that the copolymerizable monomer may not be contained at all.

In the present invention, as the fluoroolefin (a), a fluoroolefin having a carbon number of from about 2 to about 4 and containing a fluorine atom, such as trifluoroethylene, chlorotrifluoroethylene, tetrafluoroethylene, trifluoropropylene, tetrafluoropropylene, vinylidene fluoride, pentafluoropropylene, hexafluoropropylene, tetrafluorobutylene or pentafluorobutylene is preferred, and particularly, trifluoroethylene, chlorotrifluoroethylene, tetrafluoroethylene, vinylidene fluoride or hexafluoropropylene is preferred. Further, another halogen atom such as a chlorine atom may be contained together with a fluorine atom.

The monomer (b) having a curable functional group is not particularly limited, and it may, for example, be a monomer having a group such as a hydroxyl group (i), a carboxyl group (ii) or an epoxy group (iii) as the curable functional group.

The monomer having a hydroxyl group (i) may, for example, be 2-hydroxyethyl vinyl ether, 3-hydroxypropyl vinyl ether, 4-hydroxybutyl vinyl ether, 4-hydroxycyclohexyl vinyl ether, 1-hydroxymethyl-4-vinyloxymethylcyclohexane, 2-hydroxyethyl crotonate, 2-hydroxyethyl allyl ether, allyl alcohol, 2-hydroxyethyl (meth)acrylate, 3-hydroxypropyl (meth)acrylate, 2-hydroxypropyl (meth)acrylate or 4-hydroxybutyl (meth)acrylate.

The monomer having a carboxyl group (ii) may, for example, be a monomer having a carboxyl group such as an unsaturated fatty acid, such as acrylic acid, methacrylic acid, crotonic acid, isocrotonic acid, 10-undecylenic acid (undecenoic acid), 9-octadecenoic acid (oleic acid), fumaric acid or maleic acid, or a carboxylic acid group-containing monomer of the following formula (1) or (2).

$$CH_2=CHOR^1OCOR^2COOM \quad (1)$$

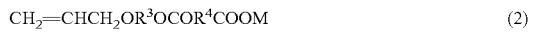

$$CH_2=CHCH_2OR^3OCOR^4COOM \quad (2)$$

wherein each of $R^1$ and $R^3$ is a $C_{2-15}$ bivalent hydrocarbon group, each of $R^2$ and $R^4$ is a saturated or unsaturated linear or cyclic bivalent hydrocarbon group, and M is a hydrogen atom, a hydrocarbon group, an alkali metal or a compound containing a nitrogen atom.

Particularly, 10-undecylenic acid is preferred, since copolymerizability with a fluororesin is good.

Such a monomer having a carboxyl group may undergo copolymerization as it is. Otherwise, in a case where a monomer which is less likely to undergo copolymerization in an acidic atmosphere, such as vinyl ether, is copolymerized, the carboxyl group may be blocked in a form of e.g. an alkali salt at the time of polymerization, and returned to the carboxyl group by acid washing after polymerization.

Otherwise, a monomer having a hydroxyl group may be used to obtain a copolymer, and a polybasic acid anhydride such as succinic anhydride is reacted with the copolymer to modify the copolymer into a copolymer having a carboxyl group.

The monomer having an epoxy group (iii) may, for example, be glycidyl vinyl ether, glycidyl allyl ether or glycidyl (meth)acrylate.

Further, another copolymerizable monomer (c) which may be used may, for example, be a vinyl ester such as vinyl acetate, vinyl propionate, vinyl butyrate, vinyl pivalate, vinyl caproate, vinyl caprylate or vinyl stearate; a vinyl ether such as methyl vinyl ether, ethyl vinyl ether, isopropyl vinyl ether, n-propyl vinyl ether, n-butyl vinyl ether, tert-butyl vinyl ether, isobutyl vinyl ether or cyclohexyl vinyl ether; an isopropenyl ether such as methyl isopropenyl ether, ethyl isopropenyl ether, isopropyl isopropenyl ether, n-propyl isopropenyl ether, n-butyl isopropenyl ether, tert-butyl isopropenyl ether, isobutyl isopropenyl ether or cyclohexyl isopropenyl ether; a (meth)acrylate such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, isopentyl (meth)acrylate, neopentyl (meth)acrylate, n-hexyl (meth)acrylate, isohexyl (meth)acrylate, 2-ethylhexyl (meth)acrylate or lauryl (meth)acrylate; a crotonate such as methyl crotonate, methyl isocrotonate, ethyl crotonate, ethyl isocrotonate, n-propyl crotonate, isopropyl crotonate, isobutyl crotonate, tert-butyl crotonate, n-hexyl crotonate or isohexyl crotonate; an allyl ether such as ethyl allyl ether, propyl allyl ether, butyl allyl ether or isobutyl allyl ether; or an olefin such as ethylene, propylene, isobutylene, 1-hexene or cyclohexene. Compatibility with the curing agent, plasticity of the coating film or the like improves by suitably using them.

The solution or dispersion of the fluorinated copolymer (A) having curable functional groups of the present invention may be obtained by polymerizing the above monomers (a) to (c) by a suitable method such as emulsion polymerization, solution polymerization or suspension polymerization to obtain a dispersion (e.g. aqueous dispersion) or a solution of the fluorinated copolymer.

In a case of emulsion polymerization for example, as a polymerization initiator, a general radical initiator, particularly a water-soluble initiator is preferably employed. Specifically, e.g. a redox initiator comprising a combination of a persulfate such as ammonium persulfate or hydrogen peroxide or both and a reducing agent such as sodium hydrogensulfite or sodium thiosulfate may be used.

The amount of the polymerization initiator is suitably changed depending upon e.g. its type or emulsion polymerization conditions. Usually, it is preferably from about 0.005 to about 0.5 part by mass per 100 parts by mass of the monomer to be emulsion-polymerized. Further, such a polymerization initiator may be added all at once or dividedly.

With a purpose of increasing pH of the emulsion, a pH adjustor may be used. The pH adjuster may, for example, be an inorganic base such as sodium carbonate, potassium carbonate, sodium orthophosphate or sodium thiosulfate, or an organic base such as triethylamine, triethanolamine, dimethylethanolamine or diethylethanolamine.

The emulsion polymerization initiation temperature is suitably selected depending upon the type of the polymerization initiator. Usually, it is preferably from about 0 to about 100° C., particularly preferably from about 10 to about 90° C. The polymerization temperature is from about 20 to about 120° C. The polymerization pressure may be suitably selected. It is usually from about 0.1 to about 10 MPa, particularly from about 0.2 to 5 MPa.

The monomers may be introduced by various methods such as a method wherein all the monomers are introduced into a reactor all at once, a method wherein all the monomers are continuously introduced, a method wherein all the monomers are introduced dividedly, and a method wherein part of the monomers is introduce to initiate the polymerization reaction, and then the rest is introduced dividedly or continuously.

Gelation Inhibitor (B)

Now, the gelation inhibitor (B) is explained below.

The fluorinated copolymer (A) having curable functional groups of the present invention is generally considered not to undergo gelation at the time of concentration by heating, unless e.g. a curing agent is blended. However, the present inventors have found that at the time of producing a powder coating material by means of a thin-film vacuum evaporator, unexpectedly, gelation takes place even at a drying temperature at which usually the gelation does not take place (for example, drying temperature of at most 160° C.).

The present invention is to overcome such another problem, and first, it is characterized in that the gelation inhibitor (B) is added and blended in a solution or dispersion of the fluorinated copolymer (A). The present invention is, secondly, characterized in that the gelation inhibitor (B), a curing agent (C) and other additives (D) for powder coating material are added and blended in a solution or dispersion of the fluorinated copolymer (A).

As the gelation inhibitor (B) to be used in the present invention, the following compounds may be mentioned as preferred examples.

Phenols such as 2,6-di-tert-butyl-4-methylphenol (BHT), n-octadecyl-3-(3,5-di-tert-butyl-4-hydroxyphenyl)propionate, 2-tert-butyl-6-(3-tert-butyl-2-hydroxy-5-methylbenzyl)-4-methylphenyl acrylate, 1,6-hexamethylenebis[(3,5-di-tert-butyl-4-hydroxyphenyl)propionate], 2,4,6-tridecylphenol, 4-tert-butylphenol, 4-nonylphenol, 3,5-dinonylphenol, 4-cyclohexylphenol, 4-phenylphenol, 4-octylphenol, phenol, cresol, 2,3-xylenol, 4-butylphenol, 4-isopentylphenol, 4-ethylphenol, 4-isopropylphenol, 4-(2-ethylhexyl)phenol, 4-(1,1-dimethylheptyl)phenol, 4-decylphenol, 4-(1,1-dimethylhexyl)phenol, 4-isohexylphenol, 4-octadecylphenol, 3,5-diisobutylphenol, 3,5-dipentylphenol and 1,3-diphenylol propane.

Epoxy compounds such as epoxidized soybean oil, epoxidized linseed oil, epoxidized tung oil, epoxidized fish oil, epoxidized castor oil, epoxidized safflower oil, methyl epoxy stearate, triglycidyl isocyanurate, 3-(2-xenoxy)-1,2-epoxypropane, epoxidized polybutadiene, bisphenol-A diglycidyl ether, 3-vinylcyclohexene diepoxide, dicyclopenatdiene diepoxide, alkyl esters of 3,4-epoxycyclohexanecarboxylic acid and bis(3,4-epoxycyclohexyl) adipate.

Phophites such as triphenyl phosphite, trioctyl phosphite, trilauryl phosphite, tridecyl phosphite, octyldiphenyl phosphite, trisisodecyl phosphite, phenyl isodecyl phosphite, phenyl di(tridecyl) phosphite, diphenyl isooctyl phosphite, diphenyl decyl phosphite, tris(nonylphenyl) phosphite, tris (2-ethylhexyl) phosphite, tributylphosphite, dilauryl acid phosphite, dibutyl acid phosphite, tris(dinonylphenyl) phosphite, trilauryl trithiophosphite and trilauryl phosphite.

Antioxidants of e.g. a combination of the above compounds and a metal soap such as zinc stearate, calcium stearate, barium stearate, calcium ricinoleate or barium laurate.

Hindered amine type light stabilizers which are abbreviated to HALS, such as bis(2,2,6,6-tetramethyl-4-piperidyl) sebacate, 2,2,6,6-tetramethyl-4-piperidyl stearate, 1,2,2,6,6-pentamethyl-4-piperidyl stearate, 2,2,6,6-tetramethyl-4-piperidyl benzoate, bis(1,2,2,6,6-pentamethyl-4-piperidyl) sebacate, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine and 4-stearyloxy-2,2,6,6-tetramethylpiperidine.

Such a gelation inhibitor (B) is added in an amount of from about 0.02 to about 15 mass %, preferably from about 0.02 to about 10 mass %, more preferably from 0.05 to 5 mass %, based on the fluorinated copolymer (A).

Further, other than the above, a triazine type stabilizer such as hydroxyphenyltriazine; or a sulfur type stabilizer such as dilauryl thiodipropionate, dimyristyl thiodipropionate, distearyl thiodipropionate, glycerol tributylthiopropionate or glycerol trioctylpropionate may be used.

In the present invention, by adding such a gelation inhibitor (B), followed by drying by a thin-film vacuum evaporator, gelation of the fluorinated copolymer (A) at the time of drying is substantially prevented. The mechanism is not completely understood at present. Probably, it is estimated that a causative substance which is considered to cause the gelation, such as double bonds, hydroperoxide or unstable groups such as unstable chlorine atoms, which are present in the resin structure of the copolymer in an extremely small amount, or an extremely small amount of an unstable substance which remains when the resin is isolated from the polymerization system, is stabilized by addition of the above gelation inhibitor (B).

Curing Agent (C)

The curing agent (C) to be used in the present invention may, for example, be a blocked isocyanate compound, for example, a blocked isocyanate curing agent obtained by blocking a polyisocyanate compound such as isophorone diisocyanate or hexamethylene diisocyanate by a blocking agent such as ε-caprolactam or methyl ethyl ketone, a uretodione compound, an amide curing agent having a β-hydroxyalkylamide group such as Primid XL-552, manufactured by EMS SHOWA DENKO K.K., or a triglycidyl isocyanurate (TGIC) curing agent. These are curing agents which undergo curing by heating. In addition, a curing agent which undergoes curing by e.g. ultraviolet rays may also be used in the present invention. The proportion of the fluorinated copolymer (A) having curable functional groups/ curing agent (C) in the present invention is preferably from 40/60 to 98/2 (based on mass), particularly preferably from 50/50 to 97/3.

The powder coating composition of the present invention basically comprises the fluorinated copolymer (A), the gelation inhibitor (B) and the curing agent (C), and as the case requires, other additives (D) for powder coating material may be added within a range of not inhibiting the object of the present invention. The additives for powder coating material may, for example, be a surface lubricating agent, a silane coupling agent, an ultraviolet absorber, a light stabilizer, a coloring pigment, a metallic pigment and an extender pigment. Further, together with the fluorinated copolymer (A), a known resin to be used for general compositions for coating material, such as an acryl resin, a polyester resin, an alkyd resin, an amino resin, an epoxy resin or a polyurethane resin may be used.

Thin-film Vacuum Evaporation Drying

Now, the thin-film vacuum evaporation drying step is explained below.

In the present invention, first, the gelation inhibitor (B) is added to the solution or dispersion of the fluorinated copolymer (A) having curable functional groups, followed by mixing, and the solution or dispersion is supplied to a thin-film vacuum evaporator to remove the solvent from the solution or dispersion. The thin-film vacuum evaporator may be any of a centrifugal thin-film vacuum evaporator, a belt thin-film vacuum evaporator and a screw thin-film vacuum evaporator which are conventionally employed, and particularly when the molten fluorinated copolymer (A) has a high viscosity, a screw thin-film vacuum evaporator with which discharging is easily carried out is preferred. As the screw thin-film vacuum evaporator, a thin-film vacuum evaporator for high viscous product "EXEVA" (tradename, manufactured by SHINKO PANTEC CO., LTD.) or a twin-screw extruder may, for example, be used.

The method of removing the solvent is not particularly limited, and vacuum drying, heating or a combination thereof may be employed. Particularly, a combination of vacuum drying and heating is preferred in view of high efficiency and inhibition of deterioration by heat.

The heating temperature may be at most the upper limit temperature at which the fluorinated copolymer (A) having curable functional groups is stabilized by the gelation inhibitor (B), and at least a temperature at which the solvent is efficiently removed. Specifically, it is preferably at most 180° C. and at least 50° C. It is more preferably at most 160° C. and at least 80° C.

In the present invention, secondly, the gelation inhibitor (B), the curing agent (C) and as the case requires, other additives (D) for powder coating material are added to the solution or dispersion of the fluorinated copolymer (A) having curable functional groups, followed by mixing to obtain a resin composition solution or dispersion, and the solution or dispersion is supplied to a thin-film vacuum evaporator to remove the solvent from the resin composition solution or dispersion.

As the thin-film vacuum evaporator, the above apparatus may be used, and the heating temperature may be a temperature at which the fluorinated copolymer (A) and the curing agent (C) do not substantially undergo curing reaction, and drying is adequately carried out. For example, it is at most 160° C. in a case of a blocked isocyanate curing agent, it is at most 110° C. in a case of a TGIC curing agent, and it is at most 140° C. and at least 50° C. in a case of an amide curing agent having a β-hydroxyl group.

Kneading/pulverization

Then, a kneading/pulverization step is explained below.

In the present invention, first, the respective components of the fluorinated copolymer (A), the gelation inhibitor (B), the curing agent (C) and as the case requires, other additives (D) for powder coating material are mixed (dry-blended) by means of e.g. a Henschel mixer in a powder state, and then melt-mixed by e.g. a single screw or twin screw extruder. The temperature in the extruder is within a range where the fluorinated copolymer (A) and the curing agent (C) do not substantially undergo curing reaction, as mentioned above. An adequately melt-kneaded product is extruded into a form of e.g. a sheet, and the extruded product is cooled and pulverized at room temperature. The particle size distribution after pulverization is preferably from 20 to 50 μm for spray painting or from 70 to 120 μm for fluidized-bed coating.

In the present invention, secondly, the gelation inhibitor (B), the curing agent (C) and as the case requires, other additives (D) for powder coating material are added to the solution or dispersion of the fluorinated copolymer (A) having curable functional groups, followed by mixing to obtain a resin composition solution or dispersion, the solution or dispersion is supplied to a thin-film vacuum evaporator, the solvent is removed from the resin composition solution or dispersion, and the obtained kneaded product is extruded into a form of e.g. a sheet, and the extruded product is cooled and pulverized at room temperature. In this case, the fluororesin powder coating composition is obtained in a single step, and the production process is extremely simple.

The curable fluororesin powder coating composition of the present invention obtained by a thin-film vacuum evaporator as mentioned above may be used to form a coating film, by coating it on a substrate to be coated, followed by heat treatment and baking for curing.

The coating method is not particularly limited, and a conventionally known method such as electrostatic spray coating (spray coating) or fluidized-bed coating may be employed. The coating thickness is not particularly limited, but is usually from 30 to 120 μm as the thickness of the coating film. The heat treatment temperature (curing temperature) is from about 140 to about 220° C., preferably from about 150 to about 200° C., and the heat treatment time is from about 10 to about 60 minutes, preferably from about 15 to about 30 minutes.

The substrate on which the coating composition of the present invention is to be coated, may, for example, be an iron plate, stainless steel, aluminum or a zinc-treated steel plate, and its surface may be preliminarily subjected to chromium phosphate treatment, zinc phosphate treatment or chromate treatment.

EXAMPLES

Now, the present invention will be explained in further detail with reference to Synthesis Examples and Examples. However, it should be understood that the present invention is by no means restricted to such specific Examples. In the following Examples, "parts" means "parts by mass" and "%" means "mass %" unless otherwise specified.

Synthesis Example 1

Into a pressure resistant container (pressure resistance: 5.0 MPa) made of stainless steel, equipped with a stirrer and having an internal capacity of 500 L, 26.2 kg of xylene, 2.7 kg of cyclohexyl vinyl ether (CHVE), 1.5 kg of isobutyl vinyl ether (iBVE), 4.2 kg of 4-hydroxybutyl vinyl ether (HBVE), 0.17 kg of calcium carbonate and 0.01 kg of perbutyl perpivalate (PBPV) were charged, and dissolved oxygen was removed by solidification/deaeration by liquid nitrogen.

Then, 8.3 kg of chlorotrifluoroethylene (CTFE) was introduced, and the temperature was gradually raised. The reaction was continued while maintaining the temperature at 65° C. with stirring, and 10 hours later, the reactor was cooled with water to stop the reaction. After cooling to room temperature, unreacted monomers were purged, and the reactor was opened. The obtained reaction solution was filtered through diatomaceous earth to remove solid substances.

Synthesis Examples 2 to 6

The same experiment as in Synthesis Example 1 was carried out except that the composition of the monomers was changed as disclosed in Table 1.

TABLE 1

| | | Synthesis Example No. | | | | | |
|---|---|---|---|---|---|---|---|
| | | 1 | 2 | 3 | 4 | 5 | 6 |
| Monomer composition (mol %) | CTFE | 50 | 51 | | | 50 | 50 |
| | TFE | | | 45 | 45 | | |
| | CHVE | 15 | 25 | 45 | 10 | 15 | 15 |
| | EVE | | 12 | | | | |
| | iBVE | 10 | | | | | 10 |
| | Vinyl benzoate | | | | 15 | 10 | 5 |
| | Veova 10 | | | | 15 | 10 | 5 |
| | HBVE | 25 | 12 | 10 | 15 | | |
| | GVE | | | | | 15 | |
| | Undecylenic acid | | | | | | 15 |
| Solid content concentration (%) | | 39 | 38 | 40 | 38 | 39 | 41 |
| Fluorinated copolymer solution (identification) | | A-1 | A-2 | A-3 | A-4 | A-5 | A-6 |

(Note)
TFE: Tetrafluoroethylene
CTFE: Chlorotrifluoroethylene
CHVE: Cyclohexyl vinyl ether
EVE: Ethyl vinyl ether
iBVE: Isobutyl vinyl ether
HBVE: 4-Hydroxybutyl vinyl ether
GVE: Glycidyl vinyl ether Example 1

As shown in Table 2, 8.4 g of tridecyl phosphite was added to 30 kg of the fluorinated copolymer solution (A-1) obtained in Synthesis Example 1, followed by mixing. Then, the solution was supplied to a thin-film vacuum evaporator "EXEVA" (tradename, manufactured by SHINKO PANTEC CO., LTD.) through its input port so that the supply rate would be 30 kg/hr. The degree of vacuum in the inside of the evaporator was −0.09 MPa (gauge pressure), the temperature of the heat medium was 95° C., the number of stirring revolutions of the thin-film vacuum evaporator was 400 rpm, and the number of stirring revolutions of the screw for molten resin discharge was 300 rpm. The non-volatile component concentration of the solid fluorinated copolymer obtained after the solvent was removed was 99.5%. The solid fluorinated copolymer will be referred to as (A'-1).

Then, 137 g of a powder of the above solid fluorinated copolymer (A'-1), 15.0 g of Adduct B1530 (tradename, ε-caprolactam-blocked isocyanate curing agent, manufactured by Huls Corp.), 0.5 g of Modaflow 2000 (tradename, leveling agent manufactured by Monsanto Company), 0.5 g of benzoine and 30 g of titanium oxide were mixed by means of a dry blender (Henschel mixer type blender manufactured by Mitsui Kakouki K.K.) for about 1 minute, and then melt mixed by means of an extrusion kneader (Buss Ko-kneader PR-46, tradename, manufactured by Busu AG) under a temperature condition of from 90 to 130° C. The proportion of the components of the melt mixture is shown in Table 3.

The melt mixture was cooled to 20° C., pulverized by an impact hammer mill, and screened by means of a wire mesh of 180 mesh to obtain a curable fluororesin powder coating composition.

The obtained powder coating composition was electrostatically coated on a zinc phosphate-treated steel plate and cured in an oven of 180° C. for 20 minutes to obtain a coating film.

Physical properties of the obtained coating material and coating film were measured as follows. The results are shown in Table 4.

Blocking Resistance

The coating material after stored at 40° C. for 7 days was evaluated based on the following standard.

◯: No block observed at all.

Δ: A small amount of blocks observed, which can easily be crushed and returned to powder.

X: A large amount of blocks observed, which can not be returned to powder even by force.

Appearance of the Coating Film (Smoothness)

◯: No abnormality observed.

Δ: Slight seeding observed.

X: Substantial seeding observed.

Gloss (60°)

It was evaluated in accordance with JIS K5400 7.6.

Examples 2 to 6

From fluorinated copolymer solutions A-2 to A-6 as identified in Table 2, the solvent was removed in the same manner as in Example 1 to obtain solid fluorinated copolymers A'-2 to A'-6. Then, powder coating compositions having a proportion as identified in Table 3 were produced in the same manner as in Example 1, and coating was carried out in the same manner as in Example 1. The results are shown in Table 4.

Comparative Examples 1 and 2

No gelation inhibitor was added to fluorinated copolymer solutions A-4 and A-5 obtained in Synthesis Examples 4 and 5, and the solvent was removed in the same manner as in Example 1 to obtain solid fluorinated copolymers A'-7 and A'-8. Then, powder coating compositions having a proportion as identified in Table 3 were produced in the same manner as in Example 1, and coating was carried out in the same manner as in Example 1. The results are shown in Table 4.

TABLE 2

| | | Examples | | | | | | Comparative Examples | |
|---|---|---|---|---|---|---|---|---|---|
| | | 1 | 2 | 3 | 4 | 5 | 6 | 1 | 2 |
| | | Solid fluorinated copolymer | | | | | | | |
| Raw material | | A'-1 | A'-2 | A'-3 | A'-4 | A'-5 | A'-6 | A'-7 | A'-8 |
| Fluorinated copolymer solution | A-1 | 137 | | | | | | | |
| | A-2 | | 138 | | | | | | |
| | A-3 | | | 141 | | | | | |
| | A-4 | | | | 139 | | | 139 | |
| | A-5 | | | | | 137 | | | 137 |
| | A-6 | | | | | | 137 | | |

TABLE 2-continued

|  |  | Examples | | | | | | Comparative Examples | |
|---|---|---|---|---|---|---|---|---|---|
|  |  | 1 | 2 | 3 | 4 | 5 | 6 | 1 | 2 |
|  |  | Solid fluorinated copolymer | | | | | | | |
|  | Raw material | A'-1 | A'-2 | A'-3 | A'-4 | A'-5 | A'-6 | A'-7 | A'-8 |
| Gelation inhibitor | Tridecyl phosphite | 0.1 | 0.1 | 0.1 |  |  |  |  |  |
|  | Diphenylol propane |  |  |  | 0.1 | 0.1 |  |  |  |
|  | Sanol LS744[*1] |  |  |  |  |  | 0.1 |  |  |

[*1]Sanol LS744 (hindered amine type light stabilizer manufactured by Ciba-Geigy Japan Limited)

TABLE 3

|  |  | Examples | | | | | | Comparative Examples | |
|---|---|---|---|---|---|---|---|---|---|
|  | Raw material | 1 | 2 | 3 | 4 | 5 | 6 | 1 | 2 |
| Solid fluorinated copolymer | A'-1 | 53.4 |  |  |  |  |  |  |  |
|  | A'-2 |  | 52.4 |  |  |  |  |  |  |
|  | A'-3 |  |  | 56.4 |  |  |  |  |  |
|  | A'-4 |  |  |  | 52.8 |  |  |  |  |
|  | A'-5 |  |  |  |  | 53.4 |  |  |  |
|  | A'-6 |  |  |  |  |  | 56.2 |  |  |
|  | A'-7 |  |  |  |  |  |  | 52.8 |  |
|  | A'-8 |  |  |  |  |  |  |  | 56.2 |
| Curing agent | Adduct B-1530 | 15.0 | 15.0 | 15.0 |  |  |  | 15.0 | 15.0 |
|  | Adduct BF-1540[*2] |  |  |  | 15.0 |  |  |  |  |
|  | Dodecanoic diacid |  |  |  |  | 5.6 |  |  |  |
|  | TGIC |  |  |  |  |  | 18.2 |  |  |
| Additives | Modaflow 2000 | 0.5 | 0.5 | 0.5 | 0.5 | 0.5 | 0.5 | 0.5 | 0.5 |
|  | Benzoin | 0.5 | 0.5 | 0.5 | 0.5 | 0.5 | 0.5 | 0.5 | 0.5 |
|  | Titanium oxide | 30 | 30 | 30 | 30 | 30 | 30 | 30 | 30 |
| Coating conditions | Baking temperature (° C.) | 180 | 180 | 180 | 180 | 180 | 180 | 140 | 140 |
|  | Baking time (min) | 20 | 20 | 20 | 20 | 20 | 20 | 20 | 20 |

[*2]Adduct BF-1540 (Uretodione curing agent manufactured by Hüls Corp.)

TABLE 4

|  | Examples | | | | | | Comparative Examples | |
|---|---|---|---|---|---|---|---|---|
|  | 1 | 2 | 3 | 4 | 5 | 6 | 1 | 2 |
| Blocking resistance | ○ | ○ | ○ | ○ | ○ | ○ | Δ | X |
| Appearance of the coating film | ○ | ○ | ○ | ○ | ○ | ○ | X | X |
| Gloss | 137 | 120 | 135 | 138 | 129 | 120 | 108 | 110 |

Example 7

All the components of the composition of Example 7 as identified in Table 5 were mixed in a solution for 1 hour until the mixture became uniform. The obtained resin composition solution was supplied to a thin-film vacuum evaporator "EXEVA" (tradename, manufactured by SHINKO PANTEC CO., LTD.) through its input port so that the supply rate would be 30 kg/hr. The degree of vacuum in the inside of the evaporator was −0.09 MPa (gauge pressure), the temperature of the heat medium was 95° C., the number of stirring revolutions of the thin-film vacuum evaporator was 400 rpm, and the number of stirring revolutions of the screw for molten resin discharge was 300 rpm. The non-volatile component concentration of the obtained solid resin composition was 99.5%.

The solid resin composition was cooled to 20° C., pulverized by an impact hammer mill, and screened by means of a wire mesh of 180 mesh to obtain a curable fluororesin powder coating composition. The obtained powder coating composition was electrostatically coated on a zinc phosphate-treated steel plate and cured in an oven of 180° C. for 20 minutes to obtain a coating film.

Of the obtained coating material and coating film, physical properties were measured in the same manner as in Example 1. The results are shown in Table 6.

Examples 8 to 12 and Comparative examples 3 and 4

Using fluorinated copolymer compositions (solutions) as identified in Table 5, compositions for powder coating material were obtained under the same conditions as in Example 7, and coating was carried out in the same manner as in Example 7. The results are shown in Table 6.

TABLE 5

| Raw material | | Examples | | | | | | Comparative Examples | |
|---|---|---|---|---|---|---|---|---|---|
| | | 7 | 8 | 9 | 10 | 11 | 12 | 3 | 4 |
| Fluorinated copolymer solution | A-1 | 137 | | | | | | | |
| | A-2 | | 138 | | | | | | |
| | A-3 | | | 141 | | | | | |
| | A-4 | | | | 139 | | | 137 | |
| | A-5 | | | | | 137 | | | 138 |
| | A-6 | | | | | | 137 | | |
| Gelation inhibitor | Tridecyl phosphite | 0.1 | 0.1 | 0.1 | | | | | |
| | Diphenylol propane | | | | 0.1 | 0.1 | | | |
| | Sanol LS744 | | | | | | 0.1 | | |
| Curing agent | Adduct B-1530 | 15.0 | 15.0 | 15.0 | | | | 15.0 | 15.0 |
| | Adduct BF-1540 | | | | 15.0 | | | | |
| | Dodecanoic diacid | | | | | 5.6 | | | |
| | TGIC | | | | | | 18.2 | | |
| Additives | Modaflow 2000 | 0.5 | 0.5 | 0.5 | 0.5 | 0.5 | 0.5 | 0.5 | 0.5 |
| | Benzoin | 0.5 | 0.5 | 0.5 | 0.5 | 0.5 | 0.5 | 0.5 | 0.5 |
| | Titanium oxide | 30 | 30 | 30 | 30 | 30 | 30 | 30 | 30 |
| Coating conditions | Baking temperature (° C.) | 180 | 180 | 180 | 180 | 180 | 180 | 140 | 140 |
| | Baking time (min) | 20 | 20 | 20 | 20 | 20 | 20 | 20 | 20 |

TABLE 6

| | Examples | | | | | | Comparative Examples | |
|---|---|---|---|---|---|---|---|---|
| | 7 | 8 | 9 | 10 | 11 | 12 | 3 | 4 |
| Blocking resistance | ○ | ○ | ○ | ○ | ○ | ○ | Δ | X |
| Appearance of the coating film | ○ | ○ | ○ | ○ | ○ | ○ | X | X |
| Gloss | 136 | 119 | 136 | 137 | 129 | 121 | 107 | 111 |

INDUSTRIAL APPLICABILITY

According to the present invention, a fluororesin powder having curable functional groups and its coating composition can be obtained, by the production of which gelation of the resin is less likely to take place even when a solvent is removed by a thin-film vacuum evaporator under a relatively high temperature condition, the composition is easily mixed uniformly, and drawbacks of the coating film are less likely to occur.

The entire disclosure of Japanese Patent Application No. 2001-386061 filed on Dec. 19, 2001 including specification, claims and summary is incorporated herein by reference in its entirety.

What is claimed is:

1. A process for producing a fluororesin powder having curable functional groups, which comprises adding a gelation inhibitor (B) to a solution or dispersion of a fluorinated copolymer (A) having curable functional groups, followed by mixing, and supplying the solution or dispersion to a thin-film vacuum evaporator to remove the solvent from the solution or dispersion.

2. The production process according to claim 1, wherein the curable functional groups of the fluorinated copolymer (A) are at least one type selected from the group consisting of hydroxyl groups, carboxyl groups and epoxy groups.

3. The production process according to claim 1, wherein the gelation inhibitor (B) is at least one type selected from the group consisting of a phenol, an epoxy compound, a phosphite and a hindered amine type light stabilizer.

4. The production process according to claim 1, which additionally comprises adding a curing agent (C) and as the case requires, other additives (D) to said solution or dispersion of a fluorinated copolymer (A) prior to said mixing, wherein said mixing forms a resin composition solution or dispersion, which solution or dispersion is supplied to said thin-film vacuum evaporator to remove said solvent therefrom.

5. The production process according to claim 4, wherein the curable functional groups of the fluorinated copolymer (A) are at least one type selected from the group consisting of hydroxyl groups, carboxyl groups and epoxy groups.

6. The production process according to claim 4, wherein the gelation inhibitor (B) is at least one type selected from the group consisting of a phenol, an epoxy compound, a phosphite and a hindered amine type light stabilizer.

7. The production process according to claim 4, wherein the temperature at the time of the solvent removal is a temperature at which the fluorinated copolymer (A) and the curing agent (C) do not substantially undergo curing reaction.

8. The production process according to claim 1, wherein gelation inhibitor (B) is added in an amount of from about 0.02 to about 15 mass %, based on the fluorinated copolymer (A).

9. The production process according to claim 1, wherein the solvent is removed from the thin-film vacuum evaporator at a temperature of from 50 to 180° C.

10. The production process according to claim 9, wherein the solvent is removed from the thin-film vacuum evaporator at a temperature of from 80 to 160° C.

11. The production process according to claim 1, wherein the fluorinated copolymer (A) comprises, as polymerized units, (a) 35–99 mol % of at least one fluororesin, (b) 1–30 mol % of at least one monomer having a curable functional group, and (c) 0–64 mol % of another monomer copolymerizable therewith.

* * * * *